United States Patent [19]

Oda et al.

[11] 4,214,666
[45] Jul. 29, 1980

[54] TUBULAR DISCHARGE ENVELOPE COMPOSED OF A POLYCRYSTALLINE TRANSPARENT ALUMINA AND A HIGH-PRESSURE VAPOR DISCHARGE LAMP USING THE SAME

[75] Inventors: Isao Oda, Nagoya; Masayuki Kaneno, Tokoname; Noboru Yamamoto, Nagoya, all of Japan

[73] Assignee: NGK Insulators, Ltd., Nagoya, Japan

[21] Appl. No.: 963,397

[22] Filed: Nov. 24, 1978

[30] Foreign Application Priority Data

Dec. 2, 1977 [JP] Japan .................................. 52-144035

[51] Int. Cl.² .......................... H01K 1/28; H01J 61/30; C01F 7/02
[52] U.S. Cl. ................................ 220/2.1 R; 106/73.4; 423/625
[58] Field of Search ................. 423/625; 106/73.4; 313/221; 220/2.1 R

[56] References Cited

U.S. PATENT DOCUMENTS

| | | | |
|---|---|---|---|
| 3,026,177 | 3/1962 | St. Pierre et al. | 423/625 |
| 3,026,210 | 3/1962 | Coble | 423/625 |
| 3,792,142 | 2/1974 | Kobayashi et al. | 423/625 |
| 3,899,560 | 8/1975 | Sellers et al. | 423/625 |
| 3,943,324 | 3/1976 | Haggerty | 423/625 |
| 4,150,317 | 4/1979 | Laska et al. | 423/625 |

FOREIGN PATENT DOCUMENTS

| | | | |
|---|---|---|---|
| 2810265 | 9/1978 | Fed. Rep. of Germany | 106/73.4 |
| 1443741 | 7/1976 | United Kingdom | 423/625 |

OTHER PUBLICATIONS

Cahoon et al., "Journal of Amer. Ceramic Soc.", vol. 39, pp. 337–344, 1956.

*Primary Examiner*—Herbert T. Carter
*Attorney, Agent, or Firm*—Stevens, Davis, Miller & Mosher

[57] ABSTRACT

A tubular discharge envelope and a high-pressure vapor discharge lamp using the same are disclosed. The envelope is composed of a polycrystalline transparent alumina having an average crystal grain size of 20–60 μm and crystal grains of 20 μm or less which occupy not more than 30% per unit area of the envelope.

3 Claims, No Drawings

TUBULAR DISCHARGE ENVELOPE COMPOSED OF A POLYCRYSTALLINE TRANSPARENT ALUMINA AND A HIGH-PRESSURE VAPOR DISCHARGE LAMP USING THE SAME

This invention relates to a tubular discharge envelope composed of a polycrystalline transparent alumina and a high-pressure vapor discharge lamp using the same.

Recently, the use of high-pressure vapor discharge lamps provided with a tubular discharge envelope composed of polycrystalline transparent alumina has rapidly increased owing to its high luminous efficiency. In this case, it is a matter of course that the polycrystalline transparent alumina used as the envelope for high-pressure vapor discharge lamp is required to have excellent light transmission properties. In addition, significant mechanical strength and thermal shock resistance are required. Therefore, it is desired to satisfy these requirements at once in the polycrystalline transparent alumina.

In general, it is well-known that the luminous efficiency of the high-pressure vapor discharge lamp can be improved by enhancing the light transmission properties of the tubular discharge envelope and also cracking due to thermal shock in the sealing of the envelope or the switching on and off of the lamp can be prevented by increasing the mechanical strength of the envelope.

In the conventional polycrystalline transparent alumina, however, the light transmission properties are sacrificed for increasing the mechanical strength and thermal shock resistance. Alternatively, the mechanical strength and thermal shock resistance are sacrificed for enhancing the light transmission properties. This is due to the fact that the light transmission properties, mechanical strength and thermal shock resistance of the polycrystalline transparent alumina are closely related to crystal grain size. That is, as the crystal grain size increases, the light transmission properties, particularly in-line transmission are improved, but the mechanical strength and thermal shock resistance deteriorate. Conversely, as the crystal grain size becomes smaller, the mechanical strength and thermal shock resistance are improved, but the light transmission properties, particularly in-line transmission deteriorate.

It is, therfore, an object of the invention to provide a tubular discharge envelope composed of a polycrystalline transparent alumina which solves the above mentioned drawbacks of the prior art and provides excellent light transmission properties, mechanical strength and thermal shock resistance, and a high-pressure vapor discharge lamp using the same.

According to the invention, the polycrystalline transparent alumina used as the tubular discharge envelope for the high-pressure vapor discharge lamp is characterized by having an average crystal grain size of 20 to 60 $\mu m$ and crystal grains of not more than 20 $\mu m$ which occupy not more than 30% per unit area of the envelope.

That is, according to the invention, the tubular discharge envelope satisfying the light transmission properties, mechanical strength and thermal shock resistance at once is first produced by a synergistic effect of limiting the particular crystal grain size to a given amount in the polycrystalline transparent alumina.

The production of the tubular discharge envelope according to the invention will be described below.

Alumina powder having a purity of 99%, preferably more than 99.9% and an average particle size of not more than 1 $\mu m$, preferably 0.1 $\mu m$ is added and thoroughly mixed with 0.01 to 0.2% by weight of MgO, 0.01 to 0.2% by weight of $La_2O_3$ and 0.01 to 0.2% by weight of $Y_2O_3$ and then the resulting mixture is formed into a tubular shape. The thus shaped tube is thoroughly dried, heated at a temperature raising rate of about 100° C./hr in a hydrogen gas atmosphere and then sintered at a temperature of 1,600° to 1,800° C. for a period of 2 to 5 hours to obtain a tubular discharge envelope composed of the polycrystalline transparent alumina according to the invention.

Moreover, the average crystal grain size of the polycrystalline transparent alumina is considerably influenced by the particle size distribution of the alumina powder starting material, kinds and amounts of additives used, sintering conditions and the like. By optionally selecting a combination of these factors, the average crystal grain size of the resulting polycrystalline transparent alumina may be limited to a defined range (20–60 $\mu m$) and the crystal grains of the particular size (20 $\mu m$ or less) may be adjusted to an amount of not more than a defined ratio (30%) per unit area. When the average crystal grain size is less than 20 $\mu m$, the mechanical strength is improved, but the light transmission properties are deteriorated. While, when the average crystal grain size exceeds 60 $\mu m$, there is not a problem relating to the light transmission properties, but the mechanical strength is deteriorated. Therefore, the average crystal grain size of the polycrystalline transparent alumina should be limited to a range of 20 to 60 $\mu m$. Further, when the crystal grains of not more than 20 $\mu m$ occupies more than 30% per unit area of the envelope, the transmission properties, particularly in-line transmission deteriorate and hence the luminous efficiency of the lamp deteriorates. Therefore, the amount per unit area of crystal grains of not more than 20 $\mu m$ should be limited to not more than 30%, preferably not more than 20%.

The invention will be described with reference to the following example.

EXAMPLE

Alumina powder having a purity of 99.98% and an average particle size of 0.1 $\mu m$ was added and mixed with 0.01 to 0.2% by weight of each of MgO, $La_2O_3$ and $Y_2O_3$ and then the resulting mixture was formed into a tubular shape. The resulting tube after dried was sintered in a hydrogen gas atmosphere to prepare a tubular discharge envelope having an outer diameter of 9.6 mm$\phi$, an inner diameter of 8.0 mm$\phi$, a thickness of 0.8 mm and a length of 115 mm, which is composed of a polycrystalline transparent alumina having an average crystal grain size as shown in the following Table 1. The properties of this envelope are also shown in Table 1.

Next, a high-pressure sodium vapor discharge lamp of 400 W was manufactured by using the tubular discharge envelope as described above. In this case, the cracking ratio in the sealing of the envelope and luminous efficiency of the lamp were measured to obtain a result as shown in Table 1.

In Table 1, the total transmittance is measured by means of a photometer using an integrating sphere, the inline transmission is a value obtained by measuring an alumina plate of 10×10×0.5 mm prepared in the same manner as described above through a spectro-photometer with a wave length of 0.6 $\mu m$. The flexural strength is a value obtained by measuring the tube having a span length of 100 mm in a three-point bending test.

Table 1

| | Average crystal grain size (μm) | Ratio of crystal grains of not more than 20 μm per unit area (%) | Properties of tubular discharge envelope | | | Properties of high pressure vapor Discharge lamp | |
|---|---|---|---|---|---|---|---|
| | | | Total transmittance (%) | In-line transmission (%) | Flexural strength (kg/cm$^2$) | Luminous efficiency (lm/W) | Cracking ratio in the sealing (%) |
| | 55 | 3 | 94.2 | 35 | 2,260 | 129.5 | 5 |
| | 48 | 9 | 93.9 | 32 | 2,630 | 128.3 | 5 |
| Present invention | 40 | 11 | 93.5 | 28 | 3,010 | 127.0 | 0 |
| | 31 | 16 | 92.9 | 24 | 3,370 | 126.5 | 0 |
| | 22 | 20 | 92.6 | 20 | 3,610 | 125.8 | 0 |
| Control | 15 | 68 | 92.1 | 8 | 4,100 | 119.0 | 0 |
| | 80 | 5 | 94.6 | 38 | 1,050 | 130.0 | 35 |

As apparent from the data of Table 1, the tubular discharge envelope composed of the polycrystalline transparent alumina according to the invention has excellent transmission property and flexural strength, so that when the envelope is used for the high-pressure vapor discharge lamp, the luminous efficiency of the lamp is high and the cracking ratio in the sealing is less. On the contrary, the control having an average crystal grain size of 15 μm and possessing crystal grains of less than 20 μm in a ratio of 68% per unit area, which are beyond the defined ranges of the invention, is low in the light transmittance, particularly in-line transmission, so that the luminous efficiency of the lamp is low. Further, in the control having an average crystal grain size of 80 μm, the luminous efficiency of the lamp is high, but the cracking ratio in the sealing is as large as 35%.

As mentioned above, the tubular discharge envelope composed of the polycrystalline transparent alumina according to the invention exhibits excellent light transmission properties, particularly in-line transmission and mechanical strength and thermal shock resistance by the synergistic effect of limiting the particular crystal grain size to a given amount, so that the luminous efficiency of the high-pressure vapor discharge lamp, the yield of the sealing and life of the tubular discharge envelope are considerably improved.

What is claimed is:

1. A tubular discharge envelope composed of a polycrystalline transparent alumina for a high-pressure vapor discharge lamp, characterized in that the polycrystalline transparent alumina contains 0.01 to 0.2% by weight of each of MgO, La$_2$O$_3$ and Y$_2$O$_3$ and has an average crystal grain size of 20 to 60 μm and crystal grains of not more than 20 μm occupy not more than 30% per unit area of the envelope.

2. A tubular discharge envelope as claimed in claim 1, wherein the crystal grains of not more than 20 μm occupy 20% per unit area of the envelope.

3. In a high-pressure vapor discharge lamp having a tubular discharge envelope of polycrystalline transparent alumina, the improvement comprising that the polycrystalline transparent alumina contains 0.01 to 0.2% by weight of each of MgO, La$_2$O$_3$ and Y$_2$O$_3$ and has an average crystal grain size of 20–60 μm. and crystal grains of not more than 20 μm. occupying not more than 30% per unit area of said envelope.

* * * * *